(12) United States Patent
Shieh et al.

(10) Patent No.: US 8,433,495 B2
(45) Date of Patent: Apr. 30, 2013

(54) SYSTEMS AND METHODS FOR DETERMINING BLOW-BY GAS SPECIES CONCENTRATIONS

(75) Inventors: Tenghua Tom Shieh, Ann Arbor, MI (US); Shohei Nomura, Ann Arbor, MI (US); Kyle Thomas Bernier, Clarkston, MI (US); Wei Liu, Canton, MI (US)

(73) Assignee: Toyota Motor Engineering & Manufacturing, Erlanger, KY (US)

( * ) Notice: Subject to any disclaimer, the term of this patent is extended or adjusted under 35 U.S.C. 154(b) by 333 days.

(21) Appl. No.: 12/984,237

(22) Filed: Jan. 4, 2011

(65) Prior Publication Data

US 2012/0173119 A1  Jul. 5, 2012

(51) Int. Cl.
  *F02D 41/00* (2006.01)
  *G01M 15/04* (2006.01)

(52) U.S. Cl.
  USPC .......................... 701/102; 123/435; 123/572

(58) Field of Classification Search .................. 701/102, 701/103, 106, 115; 123/435, 572; 702/182; 73/114.37, 114.77, 114.78
  See application file for complete search history.

(56) References Cited

U.S. PATENT DOCUMENTS

| | | | |
|---|---|---|---|
| 4,424,709 A | 1/1984 | Meier, Jr. et al. | |
| 6,212,945 B1 | 4/2001 | Moskwa | |
| 6,240,772 B1 | 6/2001 | Thomas | |
| 6,708,557 B2 | 3/2004 | Moskwa et al. | |
| 6,975,933 B2 | 12/2005 | Abe et al. | |
| 7,021,298 B2 * | 4/2006 | Nakazawa et al. | 123/568.14 |
| 7,070,738 B2 * | 7/2006 | Mitchell et al. | 422/78 |
| 7,509,210 B2 | 3/2009 | Tsuda et al. | |
| 2004/0257361 A1 | 12/2004 | David Tabakman et al. | |
| 2007/0265805 A1 | 11/2007 | Lee et al. | |
| 2009/0141768 A1 | 6/2009 | He et al. | |

* cited by examiner

*Primary Examiner* — John T. Kwon
*Assistant Examiner* — Johnny Hoang
(74) *Attorney, Agent, or Firm* — Dinsmore & Shohl LLP

(57) ABSTRACT

In one embodiment, a method for determining a blow-by gas species concentration may include calculating one-dimensional engine performance data with a one-dimensional engine performance model. The one-dimensional engine performance data may be based at least in part upon an engine operating condition. The one-dimensional engine performance data may be transformed, automatically with a processor executing a two-dimensional ring dynamics model, into piston ring motion data. The two-dimensional ring dynamics model simulates geometrical changes to a piston-ring pack flow path. The blow-by gas species concentration may be determined with a network model including the one-dimensional engine performance model and a two-dimensional ring pack model. The two-dimensional ring pack model simulates species concentration change in the piston-ring pack flow path. The blow-by gas species concentration may be determined using the engine operating condition and the piston ring motion data.

20 Claims, 3 Drawing Sheets

SYSTEMS AND METHODS FOR DETERMINING BLOW-BY GAS SPECIES CONCENTRATIONS

TECHNICAL FIELD

The present specification generally relates to systems and methods for determining engine parameters and, more specifically, systems and methods for determining blow-by gas species concentrations.

BACKGROUND

Compression and/or combustion gases may escape from the combustion chamber in an internal combustion engine. Such blow-by gases may lead to premature aging of the engine, loss of power, or an increase in greenhouse gas emissions. Therefore, engine manufacturers commonly analyze and predict the concentration of blow-by gases to mitigate the undesirable effects of blow-by gases using modeling techniques.

Accordingly, a need exists for alternative systems and methods for determining blow-by gas species concentrations.

SUMMARY

In one embodiment, a method for determining a blow-by gas species concentration may include calculating one-dimensional engine performance data with a one-dimensional engine performance model. The one-dimensional engine performance data may be based at least in part upon an engine operating condition. The one-dimensional engine performance data may be transformed, automatically with a processor executing a two-dimensional ring dynamics model, into piston ring motion data. The two-dimensional ring dynamics model simulates geometrical changes to a piston-ring pack flow path. The blow-by gas species concentration may be determined with a network model including the one-dimensional engine performance model and a two-dimensional ring pack model. The two-dimensional ring pack model simulates species concentration change in the piston-ring pack flow path. The blow-by gas species concentration may be determined using the engine operating condition and the piston ring motion data.

In another embodiment, a method for determining a blow-by gas species concentration may include measuring engine performance test data of an engine during an engine cycle. A one-dimensional engine performance model that outputs one-dimensional engine performance data may be altered such that the one-dimensional engine performance data substantially matches the engine performance test data. An engine operating condition may be transformed, automatically with a processor executing a three-dimensional engine component model, into three-dimensional combustion bore output. The three-dimensional engine component model simulates internal combustion. The engine operating condition and the three-dimensional combustion bore output may be transformed into piston ring motion data with a two-dimensional ring dynamics model. The two-dimensional ring dynamics model simulates geometrical changes to a piston-ring pack flow path. The blow-by gas species concentration may be determined with a network model including the one-dimensional engine performance model and a two-dimensional ring pack model. The two-dimensional ring pack model simulates species concentration change in the piston-ring pack flow path. The blow-by gas species concentration may be determined using the engine operating condition.

In yet another embodiment, a system for determining a blow-by gas species concentration may include a processor and a network model including a one-dimensional engine performance model and a two-dimensional ring pack model. The one-dimensional engine performance model simulates engine performance. The two-dimensional ring pack model simulates species concentration change in a piston-ring pack flow path. The processor may execute the network model to receive an engine operating condition and piston ring motion data, and determine the blow-by gas species concentration. The blow-by gas species concentration is a transformation of the engine operating condition and the piston ring motion data.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
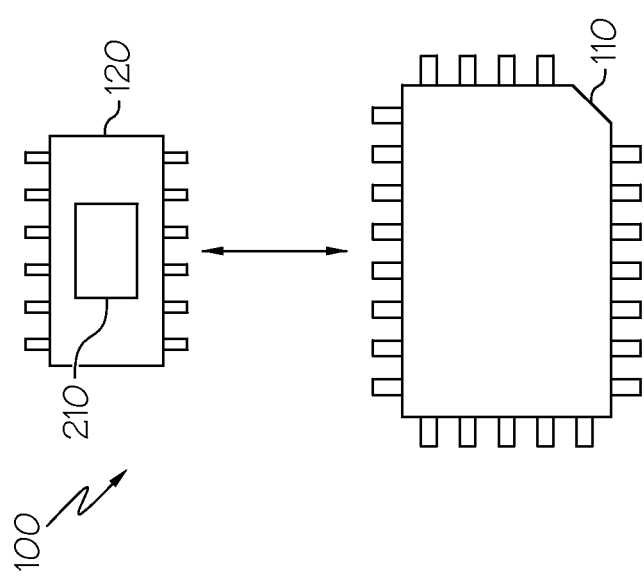
FIG. 1 schematically depicts a system for determining blow-by gas species concentrations according to one or more embodiments shown and described herein.

FIG. 1 generally depicts one embodiment of a system for determining a blow-by gas species concentration. The system generally comprises a processor communicably coupled to a memory having a network model. The processor executes the network model to calculate the blow-by gas species concentration of an engine such as, but not limited to, an internal combustion engine. Various embodiments of the systems for determining blow-by gas species concentrations and methods for determining blow-by gas species concentrations will be described in more detail herein.

Referring now to FIG. 1, the system 100 for determining a blow-by gas species concentration 212 (FIG. 3) comprises a processor 110 communicably coupled to a memory 120. The processor 110 may be an integrated circuit, a microchip, a computer, or any other computing device capable of executing machine readable instructions. The memory 120 may be RAM, ROM, a flash memory, a hard drive, or any device capable of storing machine readable instructions. It is noted that while, a single processor 110 and a single memory 120 are depicted in FIG. 1, the embodiments described herein may comprise distributed computing devices. Specifically, multiple autonomous processors and multiple autonomous memories may be communicably coupled and configured to cooperate in a manner analogous to the single processor 110, single memory 120 embodiments described herein.

Furthermore, it is noted that the phrase "communicatively coupled," as used herein, means that components are capable of exchanging data signals with one another such as, for example, electrical signals via a conductive medium, electromagnetic signals via air, optical signals via optical waveguides, and the like.

Figure 2:
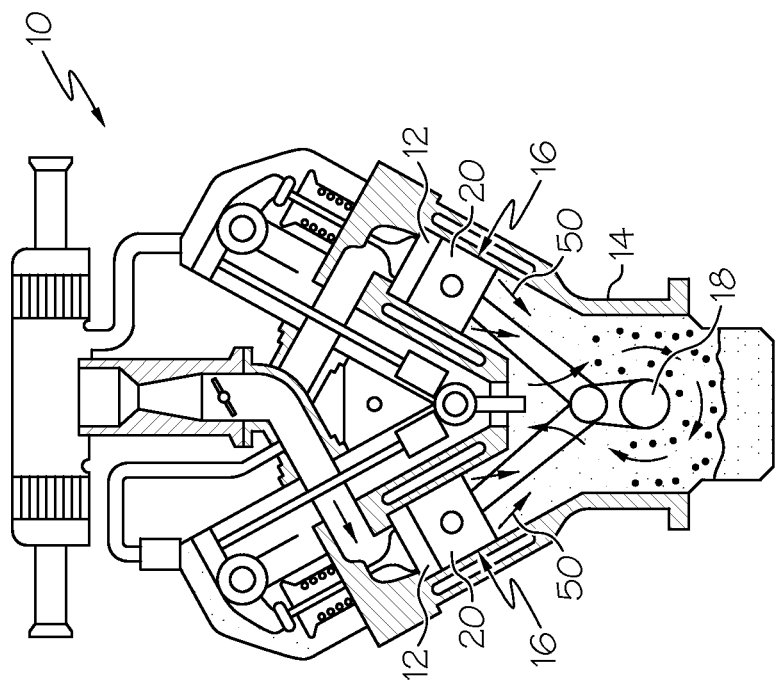
FIG. 2 schematically depicts an engine according to one or more embodiments shown and described herein.

Referring now to FIG. 2, which schematically depicts the cross-section of an engine 10, the phrase "blow-by gas," as used herein, means a fluid comprising compression and/or combustion gases that flow from the combustion chamber 12 into the crank case 14 of the engine 10. The blow-by gas 50 typically flows past the piston 20 via a piston-ring pack flow path 16 into the crank case 14. The phrase "blow-by gas species concentration," as used herein, refers to the concentration (i.e., relative or absolute amount) of compression and/or combustion products present in the blow-by gas 50 such as, for example, oxygen, carbon dioxide, nitrous oxides ($NO_x$), water and the like, present in a blow-by gas 50.

Figure 3:
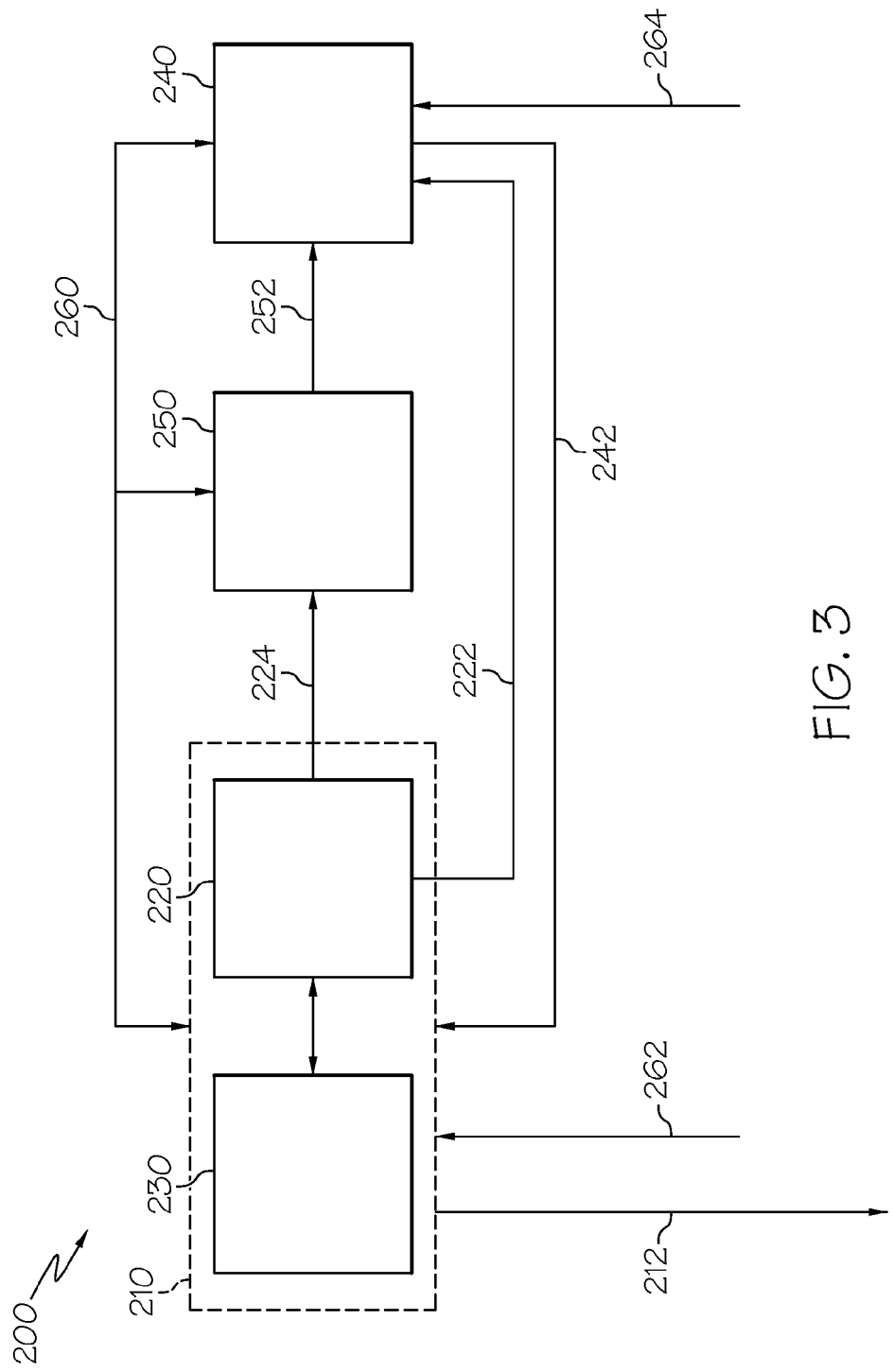
FIG. 3 schematically depicts a method for determining blow-by gas species concentrations according to one or more embodiments shown and described herein.

Referring to FIG. 3, the blow-by gas species concentration 212 is calculated by a network model 210 which comprises a one-dimensional engine performance model 220 communicably coupled (denoted in FIG. 3 by a double arrowed line) with a two-dimensional ring pack model 230. The term "model," as used herein, denotes logic or machine readable instructions written in any programming language of any generation (e.g., 1GL, 2GL, 3GL, 4GL, or 5GL) such as, for example, machine language that may be directly executed by the processor 110 (FIG. 1), or assembly language, object-oriented programming (OOP), scripting languages, microcode, etc., that may be compiled or assembled and stored on the memory 120 (FIG. 1). Alternatively, the logic or machine readable instructions may be written in a hardware description language (HDL), such as implemented via either a field-programmable gate array (FPGA) configuration or an application-specific integrated circuit (ASIC), and their equivalents. Thus any of the models described herein, may be executed by the processor 110 (FIG. 1) to transform an input to an output, determine a value, and/or calculate a value.

The phrases "one-dimensional," "two-dimensional," and "three-dimensional," as used herein, refer to the spatial dimensions of a model. The models described herein may make use of finite element method and/or finite difference method to calculate numerical solutions (in contrast to a closed form solution) to solve partial differential equations and/or integral equations. For example, one-dimensional models utilize one-dimensional meshes, two-dimensional models utilize two-dimensional meshes (e.g., triangles, squares, etc.) and three-dimensional models utilize three-dimensional meshes (e.g., tetrahedra, hexagons, etc.).

Referring still to FIG. 3, the one-dimensional engine performance model 220 performs a range of engineering or functional evaluations of the engine system. The one-dimensional engine performance model 220 performs calculations to quantify the measurable outputs of the engine being modeled. Specifically, the one-dimensional engine performance model 220 simulates the engine geometrical specifications (e.g., intake parts, exhaust parts, etc.) and transforms an engine operating condition 260 (e.g., RPM, load (%), spark timing (CA), air-fuel ratio (-), etc.) into one-dimensional engine performance data 222. The one-dimensional engine performance data 222 of the one-dimensional engine performance model 220 are the performance characteristics of the engine being modeled such as, but not limited to, engine torque (Nm), engine power (kW), engine airflow rate (kg/s), combustion pressure (Pa), intake pressure (Pa), exhaust pressure (Pa), intake mass flow rate (kg/s), exhaust mass flow rate (kg/s), cylinder pressure (bar), port inlet mass flow rate (kg/s), and port outlet pressure (Pa). As described herein, the one-dimensional engine performance model 220 is communicably coupled with a two-dimensional ring pack model 230 to form the network model 210. Thus, the one-dimensional engine performance model 220 may integrated with the two-dimensional ring pack model 230 to exchange inputs and outputs.

Figure 4:
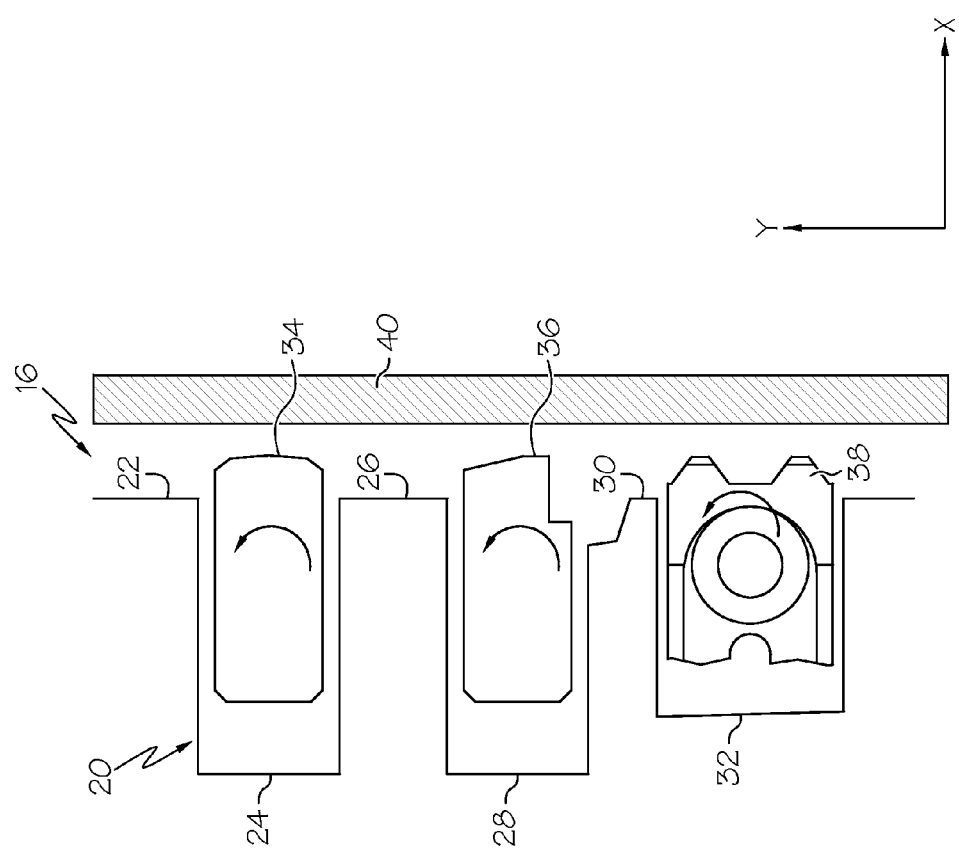
FIG. 4 schematically depicts a piston-ring pack flow path according to one or more embodiments shown and described herein.

Referring collectively to FIGS. 3 and 4, the two-dimensional ring pack model 230 simulates the piston-ring pack flow path 16. Specifically, the two-dimensional ring pack model 230 cooperates with the one-dimensional engine performance model 220 to simulate blow-by gas species concentration 212 and change of species concentration in the piston-ring pack flow path 16. The blow-by gas species concentration 212 is determined using the engine operating condition 260 and piston ring motion data 242 as input. Thus the network model 210, which combines the two-dimensional ring pack model 230 and one-dimensional engine performance model 220, may determine the blow-by gas species concentration 212 by transforming the engine operating condition 260 and piston ring motion data 242.

Referring collectively to FIGS. 2, 3 and 4, the piston ring motion data 242 describes the motion of the piston 20, a top ring 34, a second ring 36, and a oil control ring 38 during the operation of the engine 10 (i.e., during cycling caused by combustion). The motion may be in the positive or negative X direction, the positive or negative Y direction (generally indicated in FIG. 4 by the axis), and rotational (generally indicated in FIG. 4 by the curved lines with arrows). For example, the piston 20 may comprise individual rings 34, 36, 38 (i.e., a ring pack) and grooves formed in the piston 20. In the embodiment depicted in FIG. 4, the piston-ring pack flow path 16 is delineated by the piston 20 and the liner 40. The piston 20 comprises a top land 22, a top groove 24, a second land 26, a second groove 28, a third land 30 and a third groove 32 which form a specific contour of the piston 20. The top ring 34 located within the top groove 24 between the top land 22 and the second land 26, a second ring 36 located in the second groove 28 between the second land 26 and the third land 30, and a oil control ring 38 located in the third groove 32 beneath the third land 30. As can be best seen in FIG. 2, the blow-by gas 50 flows from the combustion chamber 12 past the piston 20 and through the piston-ring pack flow path 16 into the crank case 14. Thus, referring to FIG. 4, gas may flow around the individual rings 34, 36, 38 and in between the piston 20 and the liner 40. As the piston 20 is cycled (e.g., moved in the positive and negative Y direction), the top ring 34, the second ring 36, and the oil control ring 38 are capable of moving within the piston-ring pack flow path 16 independent of the piston 20. Thus, referring to FIG. 2, as the crank shaft 18 rotates the piston-ring pack flow path 16 changes. The piston ring motion data 242 describes changes to the piston-ring pack flow path 16 and may comprise data for any of the individual rings such as piston ring displacement (m) indicative of motion in the X or Y direction, piston ring twist (deg) indicative of rotation, or piston ring speed (m/s) indicative of change in displacement or rotation. The piston ring data may be derived from test data, heuristically, or from a model. It is noted that, while FIG. 4 depicts a piston 20 with three individual rings 34, 36, 38, the piston-ring pack flow path 16 may comprise any number of rings, grooves or lands.

Referring again to FIG. 3, in one embodiment a method 200 for determining a blow-by gas species concentration 212 comprises measuring engine performance test data 262 of an engine during an engine cycle. For example, an engine corresponding to the network model 210 may fitted with instrumentation to measure engine performance test data 262. The engine with instrumentation may then be operated to provide additional insight into the conditions being modeled, i.e., the engine performance test data 262 may be utilized to develop and/or validate models for engines analogous to the engine with instrumentation. The engine performance test data 262 includes data indicative of the instrumented engine such as, for example, engine geometry, liner surface roughness (microns), engine torque (Nm), engine power (kW), air flow rate (g/s), air-fuel ratio (–), volumetric efficiency (%), cylinder pressure (Pa), back pressure (Pa), and intake pressure (Pa).

The one-dimensional engine performance model 220 may be modified such that the one-dimensional engine performance data 222 substantially matches the corresponding engine performance test data 262. For example, the assumptions, boundary conditions, geometry, inputs or calculations of the one-dimensional engine performance data 222 may be altered such that the correlation between one-dimensional engine performance data 222 and engine performance test data 262 is improved. Such alterations may require a number of iterations before the one-dimensional engine performance model 220 is calibrated to the engine performance test data 262.

In an embodiment of the method 200, a blow-by gas species concentration 212 is determined by first inputting engine operating conditions 260 into the one-dimensional engine performance model 220, which may or may not have been calibrated to engine performance test data 262. The one-dimensional engine performance model 220 transforms the engine operating conditions 260 into one-dimensional engine performance data 222. The one-dimensional engine performance data 222 such as cylinder pressure may be input into a two-dimensional ring dynamics model 240.

The two-dimensional ring dynamics model 240 simulates geometrical changes to the piston-ring pack flow path 16 (FIG. 4). In one embodiment, the two-dimensional ring dynamics model 240 performs calculations to generate a mass flow pattern and gas dynamics inside the piston-ring pack flow path 16. Specifically, the two-dimensional ring dynamics model 240 receives input such as one-dimensional engine performance data 222, engine operating conditions 260, three-dimensional combustion bore output 252 and/or liner surface roughness 264, i.e., the surface roughness of the liner 40 from a measured engine or engine specification. The input may then be transformed by the two-dimensional ring dynamics model 240, automatically with a processor 110 (FIG. 1), into piston ring motion data 242, average blow-by flow rate (kg/s), instantaneous blow-by flow rate (kg/s), ring-liner contact location, ring-piston contact location, and the like.

In the embodiment of the method 200 depicted in FIG. 3, the one-dimensional engine performance model 220 transforms the engine operating condition 260 into a one-dimensional engine boundary condition 224. The one-dimensional engine boundary condition 224 may be any of the one-dimensional engine performance data 222 such as, for example, the port inlet mass flow rate or the port outlet pressure. In the depicted embodiment, the engine operating condition 260 and the one-dimensional engine boundary condition 224 are input to a three-dimensional engine component model 250. The three-dimensional engine component model 250 calculates engine operating conditions 260 of individual components or processes of internal combustion, for example, combustion, bore distortion, and engine temperature. The three-dimensional engine component model 250 can transform the engine operating condition 260 and the one-dimensional engine boundary condition 224 into three-dimensional combustion bore output 252 such as, for example, a bore distortion (micron), a cylinder pressure (bar), a temperature distribution (K), a combustion product, and concentration distribution of the combustion product.

According to one embodiment of the method 200, the three-dimensional combustion bore output 252 is input into the two-dimensional ring dynamics model 240. The two-dimensional ring dynamics model 240 transforms input into the piston ring motion data 242. Specifically, in the embodiment depicted in FIG. 4, the two-dimensional ring dynamics model 240 transforms, automatically with the processor 110 (FIG. 1), one-dimensional engine performance data 222, three-dimensional combustion bore output 252, the engine operating condition 260, and the liner surface roughness 264 measurement into the piston ring motion data 242. As is described herein, the network model 210 transforms the piston ring motion data 242 into the blow-by gas species concentration 212.

It should now be understood that, the systems and methods described herein may be utilized to calculate blow-by gas species concentration by combining models of various spatial dimensions. For example, a one-dimensional model may be utilized to determine boundary conditions and assumptions for higher dimensioned models. The two-dimensional models may be utilized to perform detailed calculations supplemented by the one-dimensional model and three-dimensional models. Use of the one-dimensional model can reduce the time required to construct and operate the model, for example relative to a three-dimensional model. By linking the models together, variously dimensioned models may cooperate to generate the blow-by gas species concentration.

It is noted that the term "substantially" may be utilized herein to represent the inherent degree of uncertainty that may be attributed to any quantitative comparison, value, measurement, or other representation. The term is also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for determining a blow-by gas species concentration, the method comprising:
   calculating one-dimensional engine performance data with a one-dimensional engine performance model, wherein the one-dimensional engine performance data is based at least in part upon an engine operating condition;
   transforming, automatically with a processor executing a two-dimensional ring dynamics model, the one-dimensional engine performance data into piston ring motion data, wherein the two-dimensional ring dynamics model simulates geometrical changes to a piston-ring pack flow path; and
   determining the blow-by gas species concentration with a network model comprising the one-dimensional engine performance model and a two-dimensional ring pack model, wherein the two-dimensional ring pack model simulates species concentration change in the piston-ring pack flow path, and the blow-by gas species concentration is determined using the engine operating condition and the piston ring motion data.

2. The method of claim 1 further comprising calibrating the one-dimensional engine performance model to engine performance test data, wherein the engine performance test data is indicative of an engine tested during an engine cycle.

3. The method of claim 2, wherein the engine performance test data comprises at least one of an engine torque, an engine power, an air flow rate, an air-fuel ratio, a volumetric efficiency, a cylinder pressure, a back pressure, and an intake pressure.

4. The method of claim 1 further comprising calculating a one-dimensional engine boundary condition with the one-dimensional engine performance model, wherein the one-dimensional engine boundary condition is based at least in part upon the engine operating condition.

5. The method of claim 4 further comprising:
receiving the engine operating condition and the one-dimensional engine boundary condition with a three-dimensional engine component model, wherein the three-dimensional engine component model simulates internal combustion; and
transforming the engine operating condition and the one-dimensional engine boundary condition into three-dimensional combustion bore output.

6. The method of claim 5 further comprising receiving the three-dimensional combustion bore output with the two-dimensional ring dynamics model, wherein the piston ring motion data is dependent upon the three-dimensional combustion bore output.

7. The method of claim 6, wherein the three-dimensional combustion bore output is at least one of a bore distortion, a cylinder pressure, a temperature distribution, a combustion product, and concentration distribution.

8. The method of claim 5 further comprising receiving a liner surface roughness measurement with the two-dimensional ring dynamics model, wherein the liner surface roughness measurement is indicative a liner of an engine.

9. The method of claim 5, wherein the one-dimensional engine boundary condition is at least one of a mass flow rate and a pressure.

10. The method of claim 2, wherein the one-dimensional engine performance data comprises a cylinder pressure.

11. The method of claim 1, wherein the piston ring motion data comprises at least one of a piston ring displacement, a piston ring twist, and a piston ring speed.

12. A method for determining a blow-by gas species concentration, the method comprising:
measuring engine performance test data of an engine during an engine cycle;
altering a one-dimensional engine performance model that outputs one-dimensional engine performance data such that the one-dimensional engine performance data substantially matches the engine performance test data;
transforming, automatically with a processor executing a three-dimensional engine component model, an engine operating condition into three-dimensional combustion bore output, wherein the three-dimensional engine component model simulates internal combustion;
transforming the engine operating condition and the three-dimensional combustion bore output into piston ring motion data with a two-dimensional ring dynamics model, wherein the two-dimensional ring dynamics model simulates geometrical changes to a piston-ring pack flow path; and
determining the blow-by gas species concentration with a network model comprising the one-dimensional engine performance model and a two-dimensional ring pack model, wherein the two-dimensional ring pack model simulates species concentration change in the piston-ring pack flow path, and the blow-by gas species concentration is determined using the engine operating condition.

13. The method of claim 12 further comprising calculating a one-dimensional engine boundary condition with the one-dimensional engine performance model, wherein the one-dimensional engine boundary condition is based at least in part upon the engine operating condition.

14. The method of claim 12 further comprising constraining the network model according to the piston ring motion data.

15. The method of claim 12, wherein the engine performance test data comprises engine torque, engine power, air flow rate, air-fuel ratio, volumetric efficiency, cylinder pressure, back pressure, or intake pressure.

16. The method of claim 12, wherein the piston ring motion data comprises piston ring displacement, piston ring twist, or piston ring speed.

17. A system for determining a blow-by gas species concentration, the system comprising a processor and a network model comprising a one-dimensional engine performance model and a two-dimensional ring pack model, wherein the one-dimensional engine performance model simulates engine performance, the two-dimensional ring pack model simulates species concentration change in a piston-ring pack flow path and the processor executes the network model to:
receive an engine operating condition and piston ring motion data; and
determine the blow-by gas species concentration, wherein the blow-by gas species concentration is a transformation of the engine operating condition and the piston ring motion data.

18. The system of claim 17 further comprising a three-dimensional engine component model that simulates internal combustion and a two-dimensional ring dynamics model that simulates geometrical changes to the piston-ring pack flow path, wherein the three-dimensional engine component model supplies three-dimensional combustion bore output to the two-dimensional ring dynamics model and the two-dimensional ring dynamics model calculates the piston ring motion data.

19. The system of claim 18, wherein the three-dimensional combustion bore output is at least one of a bore distortion, a cylinder pressure, a temperature distribution, and a combustion product concentration distribution.

20. The system of claim 17, wherein the piston ring motion data comprises at least one of a piston ring displacement, a piston ring twist, and a piston ring speed.

* * * * *